March 25, 1930.  J. TERBORG  1,751,535

COFFEE DISPENSER

Filed Oct. 10, 1928

Inventor:-
JOHN TERBORG

By Milo B. Stevens Co.

Attorneys.

Patented Mar. 25, 1930

1,751,535

UNITED STATES PATENT OFFICE

JOHN TERBORG, OF DEMOTTE, INDIANA

COFFEE DISPENSER

Application filed October 10, 1928. Serial No. 311,601.

My invention relates to receptacles for storing household commodities, such as bulk coffee, cereals, etc., and more particularly to such receptacles as also serve to dispense the commodity as desired, and my main object is to design a novel receptacle of this kind which readily delivers the quantity desired to be dispensed.

A further object of the invention is to construct the mechanism for the dispensing action whereby to enable the quantity and rate of flow to be controlled at will.

A still further object of the invention is to provide the novel receptacle with a window to enable the contents to be observed as they diminish, so that notice is had that the receptacle requires refilling.

Another object of the invention is to design the delivery apparatus to render the receptacle air-tight when it is not actuated for the dispensing action, so that the contents stored may not lose their aroma or become too dry.

A final, but nevertheless important object of the invention is to construct the delivery mechanism with few and simple parts which are efficient in action and durable in construction, so that the appliance may be free from attention or repairs for long periods.

With the above objects in view and any others that may suggest themselves from the specification and claims to follow, a better understanding of the invention may be had by reference to the accompanying drawing, in which—

The present invention has its immediate application particularly in the matter of ground coffee in bulk. Families frequently refrain from purchasing bulk coffee in quantities because of the loss in the aroma when the coffee is kept in a canister which is often opened and exposed to the air. For this reason, it is of advantage to supply a receptacle for the storage of coffee in quantities of several pounds which will have the added value of keeping the coffee confined and yet enable the same to be dispensed in the small quantities frequently required without exposing the coffee unduly to the atmosphere.

Figure 1:
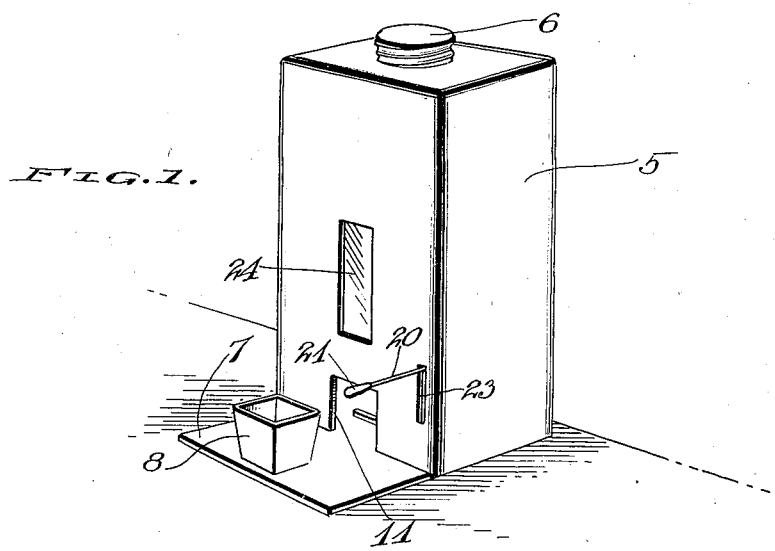
Figure 1 is a perspective view of the appliance.
Figure 2:
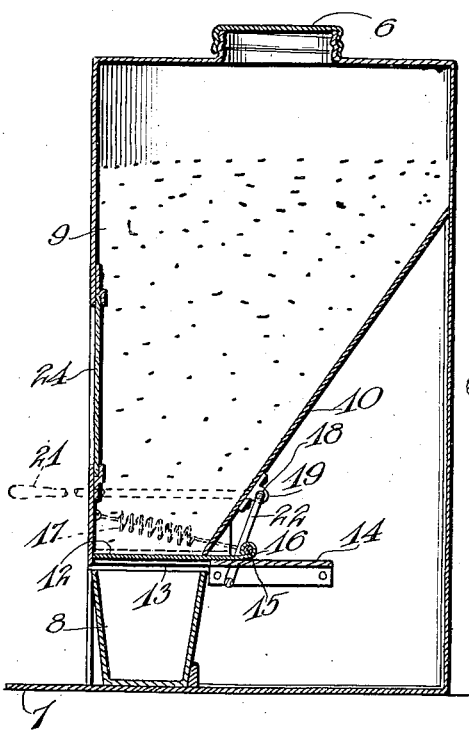
Fig. 2 is a vertical section.
Figure 3:
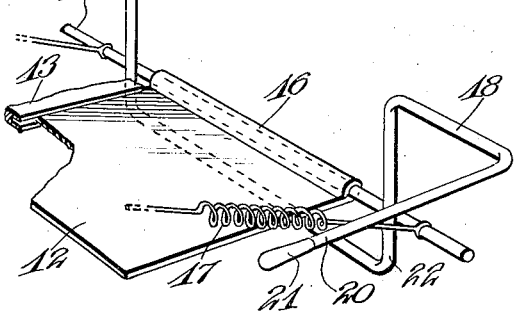
Fig. 3 is a perspective view of certain parts combining to make the delivery mechanism.

By a mere specific reference to the drawing, the general configuration of the novel receptacle is seen in Figure 1. The receptacle is generally in the form of a prism-like metal can 5, having a screw cap 6 at the top, and a base 7 at the bottom somewhat extended to receive the measuring cup or glass 8 into which a quantity of coffee is to be dispensed. Inside the receptacle, the greater portion of the space is allotted to the bulk coffee 9, the rear wall 10 of the coffee compartment slanting forwardly to concentrate the delivery of the coffee in the forward part of the receptacle. The front wall of the latter has a bottom opening 11 through which the cup or glass 8 may be inserted to receive the coffee delivery mentioned.

Normally, the delivery of the coffee into the cup 8 is prevented by a slide 12 which closes the bottom of the coffee compartment, and coffee is only deliverable when the slide is backed to permit the passage of the coffee downwardly into the cup or glass 8.

The mechanism for the operation of the slide 12 comprises first, lateral guides 13 in which the slide operates; and as the slide is backed it mounts and receives support upon a transverse shelf 14. The slide is ordinarily maintained in forward or closed position by having a cross rod 15 which passes through its enlarged rear end 16 drawn forwardly by coil springs 17 directed from the front wall of the receptacle. However, in order to back the slide, a rock shaft 18 supported in bearings 19 of the coffee compartment 10 is operated by means of a forward lever extension 20 thereof, provided with a handle 21. The rock shaft has a depending crank off-set 22 which extends along the front side of the slide rod 15. Thus, as the handle 21 is depressed to swing the crank off-set 22 rearwardly, the latter impinges upon the rod 15 accordingly, backing the slide. The lever 20 extends through a vertical slot 23 in the front wall of the receptacle, making the handle 21 readily accessible. Thus, the handle may be depressed to such an extent as to permit more or less of the coffee to flow into the cup or glass 8, regulating the speed and quantity of the flow at will.

The front wall of the receptacle is made with a glazed vertical opening 24 through which the contents of the receptacle may be seen and notice had when the contents are about to be exhausted and a refilling of the receptacle needed.

It will be seen that I have provided a very simple expedient for the purposes outlined. First, the receptacle is of a size to receive several pounds of coffee; yet, it will be of a size to easily find room on the pantry shelf or not take up much space when hung on the pantry wall or door. The slide 12 closes the bottom of the coffee compartment in a sufficiently air-tight condition to prevent the aroma of the coffee from escaping. Also, when the slide is backed to secure a delivery of coffee, the coffee compartment is but momentarily opened, and the coffee exposed to the atmosphere so brief a time that one would not expect any of the aroma to be lost from the bulk of coffee in the compartment. The coffee is not allowed to remain exposed to the air at any time, except for the few moments which is required to dispense a given amount; and even at such time, the limited passage is practically filled by the coffee flowing into the cup or glass 8, so that the exposure of the bulk of coffee may be said to be negligible. Concerning the mechanism, a simple arrangement is employed, the parts having no tendency to bind or get out of order. The action of the slide 12, which is along a horizontal plane, is not prejudiced by its relation with the crank off-set 22, as the latter is free of the rod 15 and may be swung in its arcuate path without imparting any strain on the rod. The mechanism is clearly simple and dependable, and it is placed well back of the coffee-flow area so that it may not be clogged by the same. The appliance may be produced cheaply and should induce a considerable saving to the family since it enables the coffee to be bought in quantities and kept in good condition for an extended period.

While I have illustrated and described the invention in the preferred form, it will be evident that the same is capable of many minor changes and refinements and it is my intention to include such changes and refinements as coming within the spirit and scope of the appended claims.

I claim:

1. A dispensing apparatus comprising a container having a bottom outlet, a slide for closing said outlet, a cross rod movable with the slide and projecting beyond the side edge of the same, a rock shaft pivoted adjacent said cross rod and having an arm projecting transversely of the path of movement of the cross rod and adapted to move the cross rod and associated slide to permit discharge through said bottom opening.

2. A dispensing apparatus comprising a container having a bottom outlet, a slide for closing said outlet, a cross rod transversely secured at one end of the slide and having its ends projecting beyond the side edges of the same, a rock shaft pivoted adjacent said cross rod and having arms projecting into the path of movement of each of said extended portions of the cross rod, said rock shaft having a handle extending forwardly of the same adapted to be moved for operating the cross rod and associated slide to permit discharge through said bottom opening.

In testimony whereof I affix my signature.

JOHN TERBORG.